UNITED STATES PATENT OFFICE 2,479,939

PROCESS FOR MAKING TETRAALKYL PYROPHOSPHATES

Gennady M. Kosolapoff, Dayton, Ohio, assignor to Monsanto Chemical Company, St. Louis, Mo., a corporation of Delaware No Drawing. Application April 25, 1947, Serial No. 744,035

6 Claims. (Cl. 260—461)

This invention provides a process for making tetraalkyl pyrophosphates by reacting a dialkyl chlorophosphate with water in the proportions of one mol of dialkyl chlorophosphate to not substantially in excess of one-half mol of water. By the present invention any tetraalkyl pyrophosphate where the alkyl group has from 2 to 18 carbon atoms may be produced. The reaction is preferably carried out in an organic solvent, which solvent should be inert with respect to the reactants and products involved in the reaction.

While I do not completely understand the theory governing my process, it appears that the present invention is based on a combined hydrolysis and condensation reaction which may be written as follows:

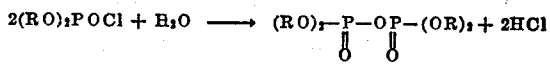

where R is any alkyl radical having from 2-18 carbon atoms.

For the best results, the above hydrolysis and condensation reaction is carried out in the presence of an inert solvent. Any solvent which does not contain free hydroxyl groups, that is, which does not contain water, alcohols or phenols, may be used. The hydrolysis reaction may be carried out upon the dialkyl chlorophosphate when dissolved in any inert solvent. Any temperature may be used between about 0° and not susbtantially higher than about 100° C. The reaction may also be carried out under any pressure including ordinary atmospheric, subatmospheric or super-atmospheric pressure. It is preferred, however, so to conduct the reaction that the hydrogen chloride liberated by the action of water upon the dialkyl chlorophosphate is substantially completely removed from the reaction zone. This may be done by carrying the reaction out under reduced pressure, by heating the reaction mass under reduced pressure or by sweeping the hydrogen chloride out by means of an inert gaseous stream or by vaporizing the solvent in which the reaction is carried out.

The dialkyl chlorophosphate may be prepared by the chlorination of a dialkyl phosphite, as disclosed in U. S. Patent No. 2,409,039, issued to Edgar E. Hardy and myself on October 8, 1946. By following the procedure described in the above patent, it is possible to prepare any dialkyl chlorophosphaate cheaply and in good yield. By this method the dialkyl chlorophosphate may be obtained either in a crude or in the pure stabilized form, although for the present purpose it need not be especially purified.

The dialkyl chlorophosphate either in crude or purified form is first dissolved in an inert solvent. Water is next added to the solution, while the latter is being agitated until approximately one-half mol of water has been added per mol of dialkyl chlorophosphate. Water may be added either in the form of steam, as liquid water, or as ice. It is also practical in carrying out my process to employ a mixture of air and water vapor or steam in order to supply the necessary water for the herein-disclosed hydrolysis reaction. Where air or any other inert gas is employed, it may be caused to bubble through the reaction liquid and upon evolution therefrom will carry out of the reaction zone the hydrogen chloride formed in the reaction. The hydrogen chloride liberated by the action of water may also be removed by applying a reduced pressure to the solution, or it may be removed by vaporizing the solvent and "sweetening" the reaction mixture by removing the hydrogen chloride as disclosed in the patent referred to above. Under these conditions the product of hydrolysis and condensation is a tetraalkyl pyrophosphate. It may be recovered by removing any residual solvent, after which the product can be distilled if it comprises a lower alkyl ester, the alkyl groups of which contain 3 or less carbon atoms, or the solvent may be distilled from the product.

In order to accelerate the reaction between water and the organic phases, it may be desirable to add a small amount of, say, one-half or one per cent by weight of the condensation product of ethylene oxide and a fatty acid or long chain alcohol. Suitable products of this type are described in U. S. Patent 1,970,578 to Schoeller.

The quantity of water employed in order to effect the hydrolysis should be about that theoretically required for hydrolysis of the dialkyl chlorophosphate, but insufficient for hydrolysis of the tetraalkyl pyrophosphate. Accordingly, the highest yield of the tetraalkyl pyrophosphate is obtained when the amount of water is just sufficient to completely hydrolyze the dialkyl chlorophosphate. If the amount of water is insufficient to completely hydrolyze all of the dialkyl chlorophosphate, the product will consist of a mixture of tetraalkyl pyrophosphate and dialkyl chlorophosphate. This mixture, after removal of hydrogen chloride, may be separated into its constituents by distillation of the pyrophosphate ester either by a vacuum distillation, in the cases where the alkyl group is not larger than 3 carbon atoms, or by solvent extraction, where the alkyl group is larger than 3 carbon atoms. If the amount of water added is in excess of that required to hydrolyze all of the chlorophosphate, the yields of the desired product will be lower due to the further hydrolysis of the tetraalkyl pyrophosphate.

Because of the high yields obtained by my process, the product may be employed in crude form as herein produced, particularly where the material is to be used for insecticidal purposes. In many cases the separation of the inert solvent and product may not be necessary. This is particularly true where the product is designed to be employed in solution especially for the spraying of vegetation infested with aphids, red spiders and the like.

Suitable solvents which may be used for carrying out the present invention are:

Benzene
Toluene
Xylene
Acetone
Dioxane
Chloroform
Carbon tetrachloride
Ethyl ether
Petroleum ether
Kerosene, etc.

The following examples are offered as illustrating this invention:

Example 1

One-half mol of diethyl chlorophosphate was dissolved in 100 cc. of benzene and treated with one-fourth mol of water. The mixture was stirred and heated to 40° until homogeneous. Distillation of the crude product gave 38 grams of tetraethyl pyrophosphate boiling at about 110° at a pressure of 0.05 mm. of mercury.

Example 2

One gram mol of diisopropyl chlorophosphate is dissolved in 200 cc. of anhydrous xylene at 20° and at this temperature treated with one-half mol of $H_2O$ while stirring the same. The solution was then heated to 50° C. under a vacuum and about 100 cc. of xylene distilled therefrom. Hydrogen chloride is liberated from the solution with the vaporized xylene. An additional 200 cc. of anhydrous xylene is added and again distilled until 100 cc. had passed over. The residual solution is substantially free of HCl. An additional quantity of xylene is added until the concentration of the tetra-isopropyl pyrophosphate is approximately one-half per cent by weight. This solution may now be used as an insecticidal spray upon aphids and red spiders and in fact is effective upon any insects against which nicotine compounds have been used in the past. It is several times as effective against aphids as nicotine phosphate employed in the same concentration.

Example 3

One gram mol of diamyl chlorophosphate is dissolved in 250 cc. of anhydrous toluene at 15° and treated with about one-half mol of $H_2O$. The reaction solution is stirred until clear, then warmed to 40° under vacuum while continuing agitation and distillation of toluene until HCl is substantially completely eliminated from the residue in the flask. The residue remaining in the flask is tetraamyl pyrophosphate, a brownish oil.

Example 4

Two gram mols of di-n-hexyl chlorophosphate is dissolved in 600 cc. of petroleum ether. One mol of water is added at a temperature of 20° and the solution aerated with dry air until the HCl is substantially eliminated therefrom. The residue of petroleum ether is distilled off and the product in the flask is substantially pure tetra-n-hexyl pyrophosphate.

Example 5

One-half gram mol of di-n-octyl chlorophosphate is dissolved in 200 cc. of toluene and treated with one-fourth mol of $H_2O$ at 40° C. The solution, after stirring for two hours, is treated for removal of HCl, as in Example 4 above. The residue which is obtained after removal of ethylene dichloride by distillation is tetra-n-octyl pyrophosphate and is obtained in substantially theoretical yield.

Example 6

In place of di-n-octyl chlorophosphate I employ di(2-ethylhexyl) chlorophosphate. The process is carried out substantially as described in Example 5 above, and tetra-(2-ethylhexyl) pyrophosphate obtained in good yield.

Example 7

One mol of dilauryl chlorophosphate is dissolved in dry kerosene and treated with one-half mol of water at 50° C. HCl is removed as in Example 4 above. The product, tetralauryl pyrophosphate, dissolved in kerosene after dilution to a concentration of about one-half per cent, may be used directly as an insecticidal spray. If desired, the kerosene may be completely removed by distillation and the product recovered in concentrated form.

Example 8

Two gram moles of distearyl chlorophosphate, dissolved in dry petroleum ether, are treated with one mol of water and HCl eliminated as described in Example 4 above. The solvent is evaporated and the product, tetrastearyl pyrophosphate, recovered as a heavy, brownish oil.

As is evident from the above examples, any dialkyl chlorophosphate having an alkyl group of from 2 to 18 carbon atoms may be used for the present process.

Having now particularly described my invention with reference to the specific details of certain embodiments thereof, it is not intended that such details shall be regarded as limitations upon the scope of the invention except insofar as included in the accompanying claims.

What I claim is:

1. The process which comprises treating at a temperature between about 0° C. and about 100° C. a solution of a dialkyl chlorophosphate in an inert organic solvent with not substantially more than one-half mol of water per mol of dialkyl chlorophosphate and then removing hydrogen chloride from said solution.

2. The process which comprises treating at a temperature between about 0° C. and about 100° C. a solution of a dialkyl chlorophosphate dissolved in an inert organic solvent with not substantially more than about one-half mol of water per mol of dialkyl chlorophosphate, removing hydrogen chloride from said solution and then recovering a tetraalkyl pyrophosphate therefrom.

3. The process which comprises treating at a temperature between about 0° C. and about 100° C. a solution of dialkyl chlorophosphate dissolved in an inert organic solvent with not substantially more than about one-half mol of water per mol of dialkyl chlorophosphate, removing hydrogen chloride from said solution by vaporizing said solvent and then recovering a tetraalkyl pyrophosphate.

4. The process which comprises treating at a temperature above 0° C. and not substantially higher than 100° C. a solution of diethyl chlorophosphate dissolved in an inert organic solvent with not substantially more than about one-half mol of water per mol of diethyl chlorophosphate, removing hydrogen chloride therefrom and then recovering tetraethyl pyrophosphate.

5. The process which comprises treating at a temperature above 0° C. and not substantially higher than 100° C. a solution of diethyl chlorophosphate in an inert anhydrous organic solvent with one-half mol of water per mol of diethyl chlorophosphate and recovering tetraethyl pyrophosphate from said organic solvent.

6. The process which comprises treating at a temperature above 0° C. and not substantially higher than 100° C. a solution of diethyl chlorophosphate in dry benzene with one-half mol of water per mol of diethyl chlorophosphate and then distilling said benzene and recovering tetraethyl pyrophosphate.

GENNADY M. KOSOLAPOFF.

REFERENCES CITED

The following references are of record in the file of this patent:

Wichelhaus, "Annalen der Chemie" (Liebigs), Supplement vol. 6 (1868), pages 262–264.